(12) United States Patent
Yamawaki et al.

(10) Patent No.: US 11,251,990 B2
(45) Date of Patent: Feb. 15, 2022

(54) CONTROL DEVICE, CONTROL SYSTEM, CONTROL METHOD, AND NON-TRANSITORY STORAGE MEDIUM STORING CONTROL PROGRAM

(71) Applicant: OMRON Corporation, Kyoto (JP)

(72) Inventors: Yasushi Yamawaki, Los Angeles, CA (US); Taishi Kawaguchi, Kyoto (JP); Kojiro Baba, Kusatsu (JP); Shigenori Sawada, Takatsuki (JP)

(73) Assignee: OMRON Corporation, Kyoto (JP)

( * ) Notice: Subject to any disclaimer, the term of this patent is extended or adjusted under 35 U.S.C. 154(b) by 138 days.

(21) Appl. No.: 16/639,741

(22) PCT Filed: Jan. 22, 2019

(86) PCT No.: PCT/JP2019/001745
§ 371 (c)(1),
(2) Date: Feb. 17, 2020

(87) PCT Pub. No.: WO2019/176287
PCT Pub. Date: Sep. 19, 2019

(65) Prior Publication Data
US 2020/0186385 A1   Jun. 11, 2020

(30) Foreign Application Priority Data

Mar. 13, 2018   (JP) .............................. JP2018-045135

(51) Int. Cl.
*H04L 12/403* (2006.01)
*G05B 19/042* (2006.01)
(Continued)

(52) U.S. Cl.
CPC ........ *H04L 12/403* (2013.01); *G05B 19/0423* (2013.01); *H04L 41/12* (2013.01); *H04L 43/0858* (2013.01); *G05B 2219/25006* (2013.01)

(58) Field of Classification Search
CPC .. G05B 19/04–0428; G05B 19/05–058; G05B 2219/25006; H04L 12/40–407;
(Continued)

(56) References Cited

U.S. PATENT DOCUMENTS 6,449,515 B2 *   9/2002   Imoto .................. H05K 7/1484
                                                    700/23
8,346,378 B2 *   1/2013   Ono ....................... G05B 19/05
                                                    700/23
(Continued)

FOREIGN PATENT DOCUMENTS

EP         3101496 A1 *  12/2016  ........... G06F 9/4843
JP         H0452905         2/1992
(Continued)

OTHER PUBLICATIONS

"International Search Report (Form PCT/ISA/210) of PCT/JP2019/001745," dated Apr. 23, 2019, with English translation thereof, pp. 1-4.
(Continued)

*Primary Examiner* — Chi H Pham
*Assistant Examiner* — Vladislav Y Agureyev
(74) *Attorney, Agent, or Firm* — JCIPRNET

(57) ABSTRACT

Provided is a control device comprising a communication management part and a user application processing part. The user application processing part is for detecting slave devices, which are communication targets of control data having been set using a setting tool, and the slave devices are connected to a filed bus. The communication management
(Continued)

part is for managing the communication of the control data in accordance with a control cycle. The communication management part determines the control cycle using a pre-stored propagation delay time for each of the slave devices that are the communication targets of the control data.

10 Claims, 4 Drawing Sheets

(51) Int. Cl.
*H04L 12/24* (2006.01)
*H04L 12/26* (2006.01)

(58) Field of Classification Search
CPC ........... H04L 29/06–0695; H04L 41/12; H04L 43/08–0894
See application file for complete search history.

(56) References Cited

U.S. PATENT DOCUMENTS

| | | | | |
|---|---|---|---|---|
| 10,671,558 | B1* | 6/2020 | Evans | G06F 13/16 |
| 2002/0064185 | A1* | 5/2002 | Nakai | H04L 43/50 |
| | | | | 370/519 |
| 2013/0290776 | A1* | 10/2013 | Grosch | G05B 9/03 |
| | | | | 714/10 |
| 2013/0318041 | A1* | 11/2013 | Grosch | G05B 19/058 |
| | | | | 707/623 |
| 2013/0329753 | A1* | 12/2013 | Koumoto | H04L 43/0858 |
| | | | | 370/503 |
| 2014/0233372 | A1* | 8/2014 | Edmiston | H04L 41/0668 |
| | | | | 370/225 |
| 2015/0095690 | A1* | 4/2015 | Grosch | G05B 19/058 |
| | | | | 714/4.11 |
| 2015/0172220 | A1 | 6/2015 | Rahamim et al. | |
| 2015/0293871 | A1* | 10/2015 | Rahamim | H04L 12/437 |
| | | | | 710/106 |
| 2016/0320759 | A1* | 11/2016 | Macha | G05B 19/4185 |
| 2017/0134184 | A1* | 5/2017 | Hollander | H04L 7/0041 |
| 2017/0171051 | A1 | 6/2017 | Joo | |
| 2017/0212850 | A1* | 7/2017 | Mishra | H04L 12/403 |
| 2018/0091245 | A1* | 3/2018 | Leyrer | H04J 3/0661 |
| 2018/0284710 | A1* | 10/2018 | Abe | G05B 19/054 |
| 2019/0222407 | A1* | 7/2019 | Yoshida | H04L 7/0037 |
| 2020/0162284 | A1* | 5/2020 | Hori | H04L 12/44 |
| 2020/0195415 | A1* | 6/2020 | Evans | H04L 12/403 |
| 2020/0412813 | A1* | 12/2020 | Mong | H04L 47/283 |
| 2021/0076262 | A1* | 3/2021 | Wigren | H04L 47/283 |

FOREIGN PATENT DOCUMENTS

| | | |
|---|---|---|
| JP | 2002244701 | 8/2002 |
| JP | 2011191874 | 9/2011 |
| JP | 2012060207 | 3/2012 |
| JP | 2014120884 | 6/2014 |
| JP | 2014146070 | 8/2014 |
| JP | 2015050765 | 3/2015 |
| JP | 2015176191 | 10/2015 |
| KR | 20030006833 | 1/2003 |

OTHER PUBLICATIONS

"Written Opinion of the International Searching Authority (Form PCT/ISA/237) of PCT/JP2019/001745," dated Apr. 23, 2019, with English translation thereof, pp. 1-8.

"Search Report of Europe Counterpart Application", dated Oct. 11, 2021, p. 1-p. 9.

* cited by examiner

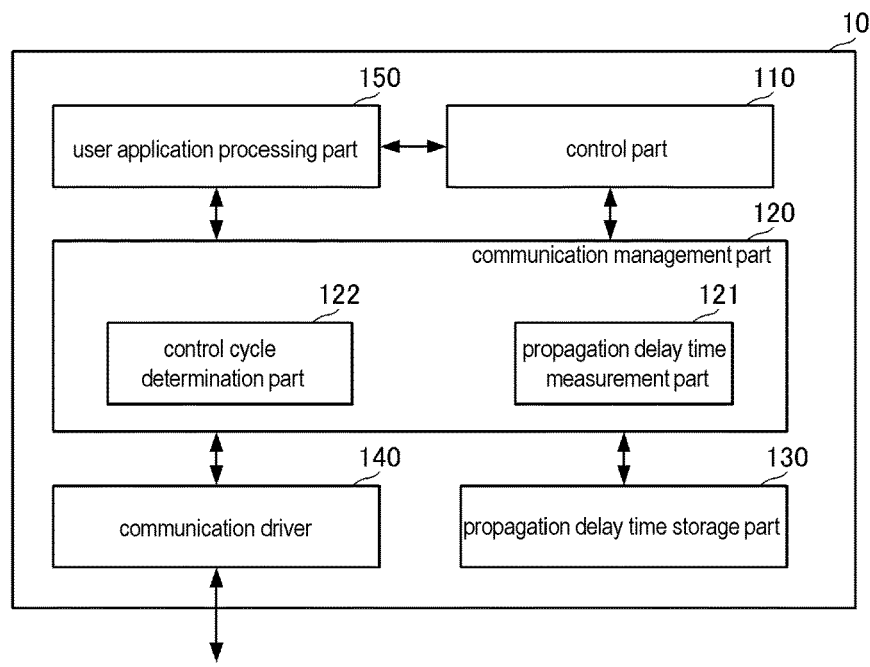
FIG. 3
| item | propagation delay time | Type. |
|---|---|---|
| slave 211 (outbound) | t211o | A |
| slave 211 (return) | t211r | |
| slave 212 (outbound) | t212o | B |
| slave 212 (return) | t212r | |
| slave 213 (outbound) | t213o | C |
| slave 213 (return) | t213r | |
FIG. 4
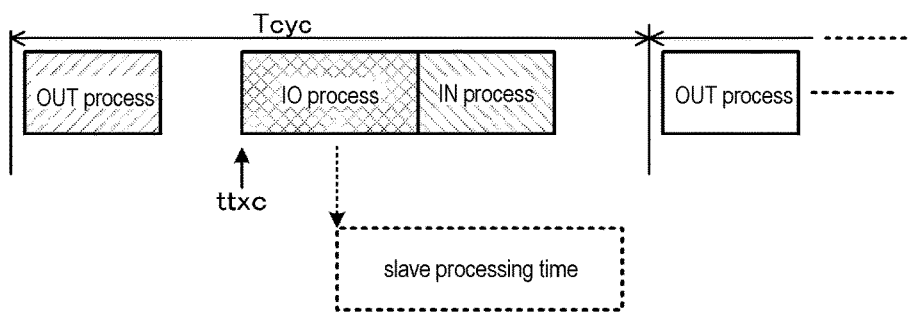
FIG. 5

CONTROL DEVICE, CONTROL SYSTEM, CONTROL METHOD, AND NON-TRANSITORY STORAGE MEDIUM STORING CONTROL PROGRAM

CROSS-REFERENCE TO RELATED APPLICATION

This application is a 371 application of the international PCT application serial no. PCT/JP2019/001745, filed on Jan. 22, 2019, which claims the priority benefit of Japan application no. 2018-045135, filed on Mar. 13, 2018. The entirety of each of the above-mentioned patent applications is hereby incorporated by reference herein and made a part of this specification.

BACKGROUND

Technical Field

The present invention relates to a technology for communicating control data in a predetermined cycle using a field bus system such as EtherCAT (registered trademark).

Background Art

Currently, many factory automation (FA) systems are in practical use. The FA systems include, for example, a control device and a plurality of slave devices, as described in Patent Literature 1. The plurality of slave devices is a measurement instrument, a switch, a control driver, or the like, and a control target device is connected to the control driver.

For example, the control device and the plurality of slave devices communicate control data using a field bus system. In this case, the control device and the plurality of slave devices communicate control data in a preset control cycle (cyclic cycle). Thereby, punctuality, a real-time property, and high speed of communication of the control data are ensured.

Normally, the control cycle is set by a setting tool such as a PC connected to the control device. In this case, the control cycle is set according to the number and topology of a plurality of slave devices connected to a field bus.

CITATION LIST

Patent Literature

[Patent Literature 1]
Japanese Patent Laid-Open No. 2014-146070

SUMMARY

Technical Problem

However, a process may not be completed in all slave devices within a control cycle according to propagation delay times of the slave devices connected to the field bus, and synchronous control according to the control cycle may not be realized.

Therefore, an objective of the present invention is to provide a technology capable of setting a control cycle at which a cyclic synchronous control can be reliably realized, at a high speed.

Solution to Problem

According to an example of the present disclosure, a control device includes a user application processing part and a communication management part. The user application processing part detects slave devices, which are communication targets of control data having been set using a setting tool, and the slave devices are connected to a filed bus. The communication management part performs communication management conforming to a control cycle of the control data. The communication management part determines the control cycle using a pre-stored propagation delay time for each of the slave devices that are the communication targets of the control data.

In this configuration, the control device can set, for example, the control cycle in which cyclic control can be realized without measuring the propagation delay time at the time of startup.

According to an example of the present disclosure, the communication management part includes a propagation delay time measurement part configured to measure the propagation delay time.

In this configuration, the control device itself can measure and store the propagation delay time.

According to an example of the present disclosure, the propagation delay time is stored in association with a type of the slave device.

In this configuration, even when the individual slave devices are different, for example, the control cycle in which cyclic control can be realized can be set using the propagation delay time for the same type of slave device.

According to an example of the present disclosure, even when there is no information on the slave device itself connected to the field network, the control cycle or the like can be accurately set using the propagation delay time for the same type of slave device.

In this configuration, the propagation delay time can be set even when the propagation delay times of all slave devices are not stored.

According to an example of the present disclosure, the control device includes a control part configured to execute operation control of the communication management part and the user application processing part. The control part executes a process of generating transmission data by the user application processing part, the communication management by the communication management part, and a process of analyzing received data by the user application processing part in this order on the basis of a process of generating transmission data in the control data.

In this configuration, an example of an operation order of the control device is shown. In this operation order, since an influence of a control error due to the propagation delay time described above is large, the configuration and process described above become more effective.

According to an example of the present disclosure, the control device includes a propagation delay time storage part configured to store the propagation delay time.

In this configuration, the control device can independently realize setting of the control cycle based on the propagation delay time.

According to an example of the present disclosure, a control system includes the control device described above; and a database connected to the control device via an information network. The database includes a propagation delay time storage part configured to store the propagation delay time.

In this configuration, even when the control device is replaced, the propagation delay time can be reliably obtained without newly performing actual measurement.

According to an example of the present disclosure, a control system includes the control device described above;

and the slave devices connected to the field bus. The slave device includes a propagation delay time storage part configured to store the propagation delay time.

In this configuration, the propagation delay times of the slave devices can be obtained from the respective slave devices.

Advantageous Effects of Invention

According to the present invention, the control cycle at which cyclic synchronous control can be reliably realized can be set at high speed.

BRIEF DESCRIPTION OF THE DRAWINGS

FIG. 3 is a functional block diagram of the control device.
FIG. 4 is an image diagram illustrating a storage state of a propagation delay time.
FIG. 5 is a diagram illustrating an example of a scheduling model of control that is executed by the control device.

DESCRIPTION OF THE EMBODIMENTS

Figure 1:
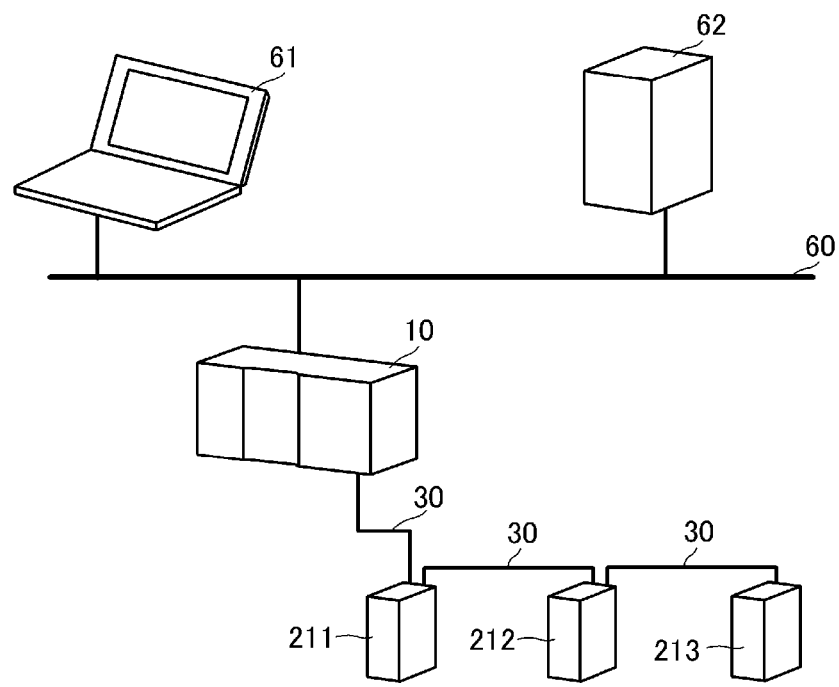
FIG. 1 is a diagram illustrating a schematic configuration of a device in a control system.

Hereinafter, embodiments of the present invention will be described with reference to the drawings.

Application Example

First, an application example of a control device according to an embodiment of the present invention will be described with reference to the drawings. FIG. 3 is a functional block diagram of the control device.

The control device 10 includes a control part 110, a communication management part 120, a communication driver 140, a propagation delay time storage part 130, and a user application processing part 150, as illustrated in FIG. 3.

The communication management part 120 includes a control cycle determination part 122 and a propagation delay time measurement part 121. The communication management part 120 is connected to the communication driver 140. The communication driver 140 is connected to a slave device 211, a slave device 212, and a slave device 213 via a field network 30.

In this configuration, the control device 10, the slave device 211, the slave device 212, and the slave device 213 perform communication of control data using a field bus system of the EtherCAT (registered trademark) via the field network 30.

The propagation delay time storage part 130 stores the respective propagation delay times of the slave device 211, the slave device 212, and the slave device 213.

The control cycle determination part 122 detects slave devices that are control targets, that is, the slave device 211, the slave device 212, and the slave device 213 connected to the field network 30, from a control program analyzed by the user application processing part 150.

The control cycle determination part 122 acquires the propagation delay times of the slave device 211, the slave device 212, and the slave device 213 from the propagation delay time storage part 130, and determines the control cycle with a time length enabling cyclic synchronous control on the basis of the propagation delay times thereof.

Thereby, the control device 10 can execute communication of the control data enabling the cyclic synchronous control to be realized without performing measurement of the propagation delay time at the time of each startup.

Configuration Example

A control device, a control system, a control method, and a control program according to an embodiment of the present invention will be described with reference to the drawings. In the embodiment, a factory automation (FA) system will be described as an example of the control system.

FIG. 1 is a diagram illustrating a schematic configuration of a device in the control system. The control system 1 includes a control device 10, a slave device 211, a slave device 212, a slave device 213, a field network 30, an information communication network 60, a personal computer 61, and a database device 62, as illustrated in FIG. 1.
(Control System)

The field network 30 is a network conforming to, for example, EtherCAT (registered trademark) as a network standard. The field network 30 is not limited thereto, and may be a network in which a controller transmits data in one frame to all slave devices logically connected to a ring network, and the slave device performs "on the fly" on the received frame, thereby realizing time synchronization.

The control device 10, the slave device 211, the slave device 212, and the slave device 213 are connected to one another by the field network 30.

The information communication network 60 is, for example, a network conforming to Ethernet (registered trademark) as a network standard. The control device 10, the personal computer 61, and the database device 62 are connected to one another by the information communication network 60.

An editing tool for the control program, or the like is installed in the personal computer 61. The personal computer 61 creates, edits, and outputs a control program for the control device 10, the slave device 211, and the slave device 212. The personal computer 61 outputs the control program to the control device 10. The slave device 211, the slave device 212, and the slave device 213, which are control targets, a control command for each of the slave devices, and the like are described in this control program.

The database device 62 stores, for example, logs of the respective devices acquired from the control device 10.

The control device 10 is specifically realized by, for example, a programmable logic controller (PLC). The control device 10 may be another device as long as the device communicates control data via the field network 30.

The control device 10, for example, generates control data to be communicated via the field network 30 using the control program from the personal computer 61.

The slave device 211, the slave device 212, and the slave device 213 are specifically realized by, for example, a servo driver, or a measurement device such as a sensor. These slave devices may be, for example, a robot device or a robot control device connected to the robot device.

The control device 10, the slave device 211, the slave device 212, and the slave device 213 communicate control data according to a control cycle to be described below, and execute operations and processes in synchronization with a predetermined timing based on the control cycle.

(Hardware Configuration of Control Device)

Figure 2:
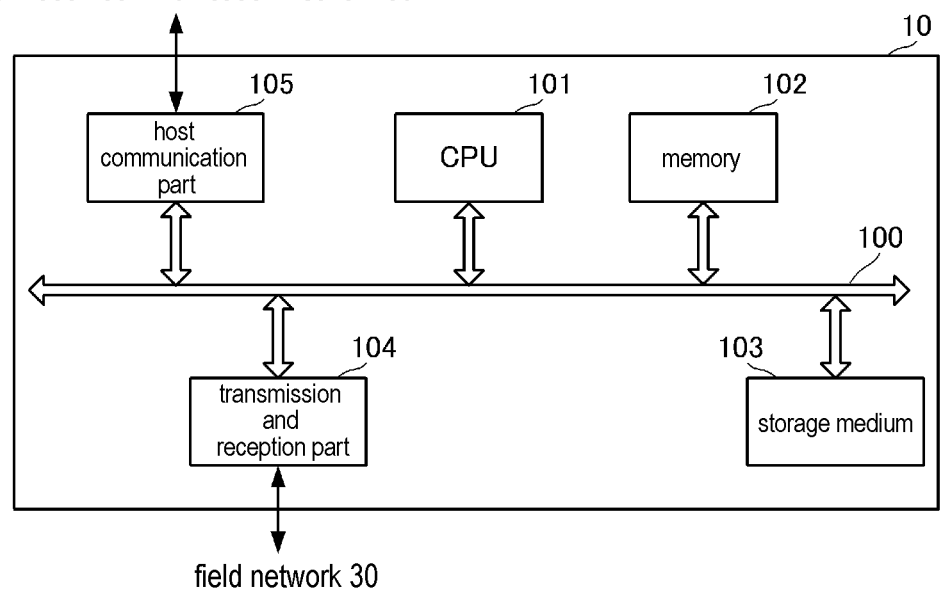
FIG. 2 is a block diagram illustrating a hardware configuration of a control device.

FIG. 2 is a block diagram illustrating a hardware configuration of the control device.

As a hardware configuration, the control device 10 includes a CPU 101, a memory 102, a storage medium 103, a transmission and reception part 104, and a host communication part 105, as illustrated in FIG. 2. In the control device 10, the CPU 101, the memory 102, the storage medium 103, the transmission and reception part 104, and the host communication part 105 are connected to one another by a data bus 100.

The CPU 101 reads a system program and a user application program stored in the storage medium 103 into the memory 102 and executes the program, thereby realizing each process of each functional block to be described below. The memory 102 is realized by a volatile storage element such as a DRAM or an SRAM. Further, the storage medium 103 is realized by a nonvolatile storage medium such as a magnetic storage medium or a flash memory.

The transmission and reception part 104 is an interface of the field network 30 in the control device 10, and executes transmission and reception (communication) of control data conforming to a cyclic cycle.

The host communication part 105 is an interface of the information communication network 60 in the control device 10 and executes communication with each device (the personal computer 61, the database device 62, or the like) of a host system described above.

(Functional Blocks of Control Device)

FIG. 3 is a functional block diagram of the control device.

The control device 10 includes the control part 110, the communication management part 120, the propagation delay time storage part 130, the communication driver 140, and the user application processing part 150, as illustrated in FIG. 3.

The control part 110 performs, for example, scheduling of an overall operation (process) of the control device 10 to perform operation control of the communication management part 120 and operation control of the user application processing part 150.

The communication management part 120 executes scheduling of communication of the control data. Further, the communication management part 120 includes the propagation delay time measurement part 121 and the control cycle determination part 122.

The propagation delay time measurement part 121 measures the propagation delay time for each of the slave devices using a known propagation delay measuring method. The propagation delay time measurement part 121 stores the measured propagation delay time in the propagation delay time storage part 130.

The propagation delay time storage part 130 stores the propagation delay time for each of the slave devices. FIG. 4 is an image diagram illustrating a storage state of the propagation delay time. The propagation delay time storage part 130 stores the propagation delay time in association with the slave device, as illustrated in FIG. 4. In this case, the propagation delay time includes an outbound propagation delay time and a return propagation delay time. The outbound propagation delay time is a propagation delay time when control data is received from the control device 10 and transmitted to a slave device on the end side. The return propagation delay time is a propagation delay time when control data is received from the slave device on the end side and transmitted to the control device 10.

Further, the propagation delay time storage part 130 also stores a type of slave device in association therewith.

The measurement and storage of the propagation delay time have been executed in advance.

The control cycle determination part 122 determines the control cycle from the propagation delay time for each of the slave devices stored in the propagation delay time storage part 130. The communication management part 120 executes scheduling of communication of control data using the control cycle.

The communication driver 140 executes control of the transmission and reception part 104 to communicate the control data via the field network 30 according to the cyclic cycle.

The user application processing part 150 executes the user application program described above. In this case, the user application processing part 150 acquires information on the slave devices, which are control targets, designated by the user application program.

In such a configuration, the control device 10 determines a control cycle Tcyc and executes communication of control data as described below. FIG. 5 is a diagram illustrating an example of a scheduling model of control that is executed by the control device. This process is controlled by the control part 110.

The control device 10 executes an OUT process with a predetermined margin time from a start timing of the control cycle Tcyc. The OUT process is a process of generating control data to be output to the slave device 211, the slave device 212, and the slave device 213, that is, control data to be output to the field network 30.

After the OUT process, the control device 10 executes the IO process. The IO process is a process of transmitting control data from the control device 10 and receiving the control data via all of the slave device 211, the slave device 212, and the slave device 213. A synchronization timing ttxc is described in the control data, and the slave device 211, the slave device 212, and the slave device 213 execute a slave process after a preset predetermined time on the basis of this synchronization timing ttxc. Thereby, the slave device 211, the slave device 212, and the slave device 213 connected to the field network 30 can execute the processing in synchronization.

After the IO process, the control device 10 executes an IN process. The IN process is a process of analyzing the control data returned via the slave device 211, the slave device 212, and the slave device 213 and acquiring necessary data.

The control device 10 sets a predetermined margin time after the IN process, and a next control cycle starts.

In such a process, when the IO process is performed during a longer time, there is concern that the next control cycle may start without ending the IN process according to the control cycle Tcyc.

Therefore, the control device 10 (the control cycle determination part 122) determines the control cycle Tcyc at the time of start of control using the following method.

The control cycle determination part 122 acquires information on the slave devices, which are control targets, from the user application processing part 150. In this case, the slave devices, which are control targets, are the slave device 211, the slave device 212, and the slave device 213.

The control cycle determination part 122 reads the propagation delay times of the slave devices, which are control targets, from the propagation delay time storage part 130. In this case, when the propagation delay time for the slave device, which is a target, is not stored in the propagation delay time storage part 130, the control cycle determination part 122 reads the propagation delay time for the slave device of a matching type from the propagation delay time storage part 130.

The control cycle determination part 122 calculates a time in which the control device 10 can execute all processes and all the slave devices can end the processes, from the acquired slave device and propagation delay time, and determines the time to be the control cycle Tcyc.

By determining the control cycle Tcyc in this way, it is possible to continuously execute control while reliably realizing synchronization.

Further, measurement of the propagation delay time may be not performed every time at the time of start of control by using this configuration and process. Therefore, the control device 10 can start the control rapidly after startup.

Further, with this configuration and process, the control device 10 can accurately set the control cycle Tcyc even when the propagation delay time for the slave device, which is a target, is not stored in the propagation delay time storage part 130.

In the above description, an aspect in which the control device 10 is divided into a plurality of functional blocks to execute a process has been shown. However, the control device 10 may be realized by a computation processing device and a program that is executed by the computation processing device, and execute each process described above.

(Measurement and Storage of Propagation Delay Time)

Figure 6:
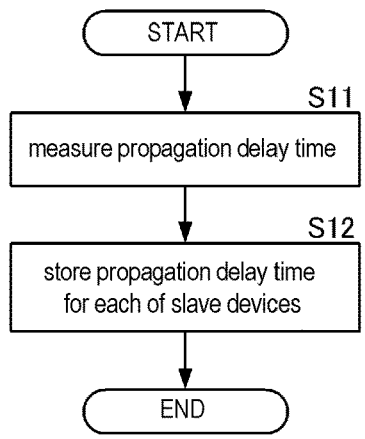
FIG. 6 is a flowchart illustrating a process of measuring and storing a propagation delay time for a slave device.

FIG. 6 is a flowchart illustrating a process of measuring and storing the propagation delay time for the slave device. As illustrated in FIG. 6, the control device 10 measures the propagation delay time (S11). A known method can be used for measurement of the propagation delay time. Schematically, the control device 10 transmits a packet for measurement of the propagation delay time to the field network 30. Each slave device generates a time stamp indicating a packet transmission time in an outbound propagation direction and stores the time stamp in the packet. Further, each slave device generates a time stamp indicating a packet reception time in a return propagation direction and stores the time stamp in the packet. The control device 10 receives this packet and measures the outbound propagation delay time and the return propagation delay time from a difference between the transmission times of the respective slave devices and a difference between the reception times of the respective slave devices.

The control device 10 stores the propagation delay time for each of the slave devices (S12). In this case, the control device may acquire a type of slave device and store the type in association therewith.

(Process at Start of Control)

Figure 7:
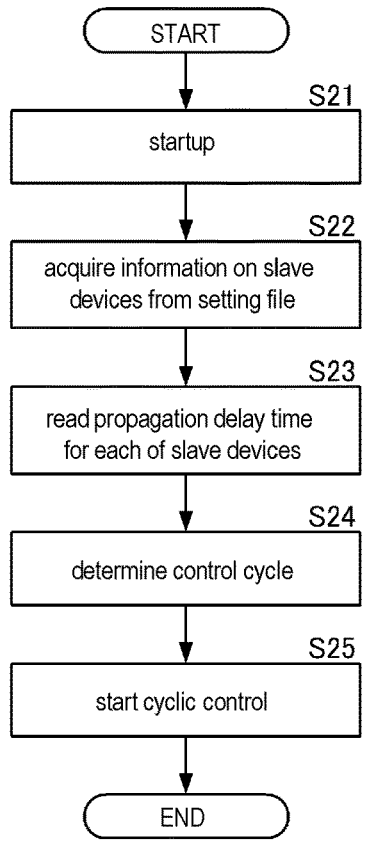
FIG. 7 is a flowchart illustrating a process at the time of start of control.

FIG. 7 is a flowchart illustrating a process at the time of start of control. As illustrated in FIG. 7, when the control device 10 starts up (S21), the control device 10 acquires information on slave devices, which are control targets, from a setting file (user application program) (S22).

The control device 10 reads the propagation delay time for each of the slave devices (S23). The control device 10 determines the control cycle Tcyc from the acquired propagation delay time (S24). The control device 10 starts cyclic control using the set control cycle Tcyc (S25).

In the above description, the propagation delay time is stored in the control device. However, the propagation delay time does not necessarily have to be stored in the control device, and may be stored in the database device 62 or each slave device. In this case, the control device 10 may execute a process illustrated in FIG. 8.

Figure 8:
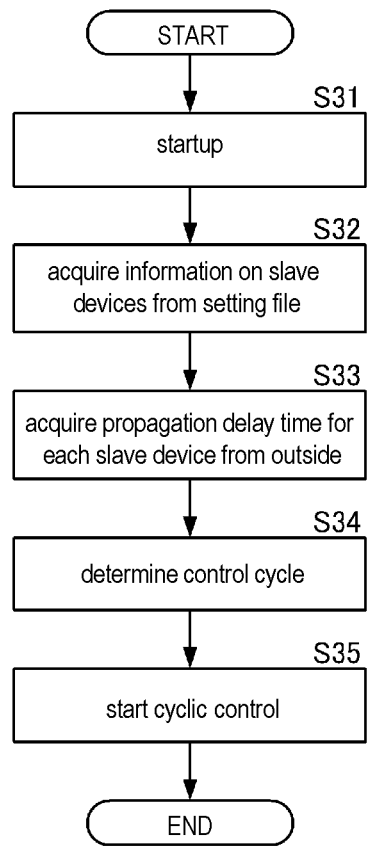
FIG. 8 is a flowchart illustrating a process at the time of start of control when a propagation delay time is externally stored.

FIG. 8 is a flowchart illustrating a process at the time of start of control when the propagation delay time is externally stored. As illustrated in FIG. 8, when the control device 10 starts up (S31), the control device 10 acquires information on slave devices, which are control targets, from a setting file (user application program) (S32).

The control device 10 acquires the propagation delay time for each of the slave devices from the outside (S33). For example, when the propagation delay time is stored in the database device 62, the control device 10 acquires the propagation delay time via the information communication network 60. Further, when the propagation delay time is stored in each slave device, the control device 10 acquires the propagation delay time via the field network 30.

The control device 10 determines the control cycle Tcyc from the acquired propagation delay time (S34). The control device 10 starts cyclic control using the set control cycle Tcyc (S35).

REFERENCE SIGNS LIST

10 Control device
30 Field network
60 Information communication network
61 Personal computer
62 Database device
100 Data bus
101 CPU
102 Memory
103 Storage medium
104 Transmission and reception part
105 Host communication part
110 Control part
120: Communication management part
121 Propagation delay time measurement part
122 Control cycle determination part
130 Propagation delay time storage part
140 Communication driver
150 User application processing part
211, 212, 213 Slave device

What is claimed is:

1. A control device realized by a computation processing device and a program that is executed by the computation processing device to execute functions of parts comprising:
    a user application processing part configured to detect slave devices, which are communication targets of control data having been set using a setting tool, and the slave devices are connected to a field bus; and
    a communication management part configured to perform communication management conforming to a control cycle of the control data, wherein the communication management part comprises:
    a control cycle determination part configured to determine the control cycle using a pre-stored propagation delay time for each of the slave devices that are the communication targets of the control data; and
    a propagation delay time measurement part configured to measure the propagation delay time, and wherein the propagation delay time is stored in association with a type of the slave devices.

2. The control device according to claim 1, comprising:
    a control part configured to execute operation control of the communication management part and the user application processing part, wherein the control part executes a process of generating transmission data in the control data by the user application processing part, the communication management by the communication management part, and a process of analyzing received data in the control data by the user application processing part in this order on the basis of a process of generating the transmission data in the control data by the user application processing part.

3. The control device according to claim 2, comprising:
a propagation delay time storage part configured to store the propagation delay time.

4. A control system comprising:
the control device according to claim 2; and
a database connected to the control device via an information network,
wherein the database comprises a propagation delay time storage part configured to store the propagation delay time.

5. A control system comprising:
the control device according to claim 2; and
the slave devices connected to the field bus,
wherein the slave device comprises a propagation delay time storage part configured to store the propagation delay time.

6. The control device according to claim 1, comprising:
a propagation delay time storage part configured to store the propagation delay time.

7. A control system comprising:
the control device according to claim 1; and
a database connected to the control device via an information network,
wherein the database comprises a propagation delay time storage part configured to store the propagation delay time.

8. A control system comprising:
the control device according to claim 1; and
the slave devices connected to the field bus,
wherein the slave device comprises a propagation delay time storage part configured to store the propagation delay time.

9. A control method comprising:
a process of detecting slave devices, which are communication targets of control data having been set using a setting tool, and the slave devices are connected to a field bus; and
a process of performing communication management conforming to a control cycle of the control data,
wherein the process of performing communication management comprises:
determining the control cycle using a pre-stored propagation delay time for each of the slave devices that are the communication targets of the control data, and
measuring the propagation delay time,
wherein the propagation delay time is stored in association with a type of the slave devices.

10. A non-transitory storage medium storing a control program causing a computation processing part to execute:
a process of detecting slave devices, which are communication targets of control data having been set using a setting tool, and the slave devices are connected to a field bus; and
a process of performing communication management conforming to a control cycle of the control data,
wherein the process of performing communication management comprises:
a process of determining the control cycle using a pre-stored propagation delay time for each of the slave devices that are the communication targets of the control data, and
measuring the propagation delay time,
wherein the propagation delay time is stored in association with a type of the slave devices.

* * * * *